(12) United States Patent
Li et al.

(10) Patent No.: US 9,823,975 B2
(45) Date of Patent: *Nov. 21, 2017

(54) EFFICIENT COMPUTATION OF SKETCHES

(71) Applicant: EMC Corporation, Hopkinton, MA (US)

(72) Inventors: Kai Li, Seattle, WA (US); Ming Benjamin Zhu, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,088

(22) Filed: Apr. 26, 2016

(65) Prior Publication Data

US 2016/0314139 A1    Oct. 27, 2016

Related U.S. Application Data

(63) Continuation of application No. 13/959,450, filed on Aug. 5, 2013, now Pat. No. 9,348,797, which is a continuation of application No. 12/910,758, filed on Oct. 22, 2010, now Pat. No. 8,527,568, which is a continuation of application No. 11/403,154, filed on Apr. 11, 2006, now Pat. No. 7,844,652.

(51) Int. Cl.
*G06F 17/15* (2006.01)
*G06F 11/14* (2006.01)
*G06F 3/06* (2006.01)
*H04L 9/06* (2006.01)

(52) U.S. Cl.
CPC .......... *G06F 11/1451* (2013.01); *G06F 3/064* (2013.01); *G06F 3/067* (2013.01); *G06F 3/0608* (2013.01); *G06F 17/15* (2013.01); *H04L 9/0643* (2013.01)

(58) Field of Classification Search
CPC ........ G06F 3/0608; G06F 3/064; G06F 3/067; G06F 17/15; H04L 9/0643
USPC ...................................................... 708/422
See application file for complete search history.

(56) References Cited

U.S. PATENT DOCUMENTS

| | | | | |
|---|---|---|---|---|
| 3,986,000 | A * | 10/1976 | McJohnson | G06K 7/10851 235/462.27 |
| 8,407,193 | B2 * | 3/2013 | Gruhl | G06F 3/0608 707/693 |
| 8,677,123 | B1 * | 3/2014 | McGregor, Jr. | H03M 7/30 380/28 |

* cited by examiner

*Primary Examiner* — Tan V. Mai
(74) *Attorney, Agent, or Firm* — Blakely, Sokoloff, Taylor & Zafman LLP (57) ABSTRACT

Determining a summary feature set is disclosed. A plurality of subsegments of a first segment are selected. For each subsegment, a plurality of values by applying a set of functions to each subsegment are computed. From all the values computed for all the subsegments, a first subset of values is selected.

21 Claims, 8 Drawing Sheets

EFFICIENT COMPUTATION OF SKETCHES

CROSS REFERENCE TO OTHER APPLICATIONS

This application is a continuation of co-pending U.S. patent application Ser. No. 13/959,450, entitled EFFICIENT COMPUTATION OF SKETCHES, filed Aug. 5, 2013, which is a continuation of U.S. patent application Ser. No. 12/910,758, now U.S. Pat. No. 8,527,568, entitled EFFICIENT COMPUTATION OF SKETCHES, filed Oct. 22, 2010, which is a continuation of U.S. patent application Ser. No. 11/403,154, now U.S. Pat. No. 7,844,652, entitled EFFICIENT COMPUTATION OF SKETCHES, filed Apr. 11, 2006, all of which are incorporated herein by reference for all purposes.

BACKGROUND OF THE INVENTION

One approach to efficiently store data is to prevent the redundant copying of data that stay the same between backups. This efficient storage is achieved by dividing the data streams from data sources into segments and storing the segments and an index of identifiers to the segments on a storage device. During subsequent backup operations, the data streams are again segmented and the segments are looked up in the index to determine whether a data segment was already stored previously. If an identical segment is found, the data segment is not stored again; otherwise, the new data segment and a new index identifier are stored. Unfortunately, as the amount of data that is to be backed up increases, the number of segments (if the segments are similarly sized) and the number of index entries increases. The increase in the number of segments and index entries leads to a reduction in access performance: for writing, an incoming segment index must be compared to all the entries in the index, and for reading, a segment associated with a file must be retrieved from a larger number of segments. If the size of the segments is increased, then the number of segments decreases and therefore the number of index entries also decreases and performance can be maintained; however, the storage efficiency drops because there are not as many occurrences of the longer identical segments. It would be beneficial if access performance could be maintained without sacrificing storage efficiency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Efficient storage using resemblance of data segments is disclosed. Resemblance is determined by comparing a summary feature set of a first segment with a summary feature set of a second segment. In some embodiments, the first segment is a segment arriving from an input data stream, and the second segment is any segment that has been previously stored from an input data stream in a backup storage system. In some embodiments, the first segment is associated with a first input data stream, and the second segment is associated with a second input data stream. In some embodiments, resemblance comprises a measure of a byte for byte similarity between a first segment and a second segment. A summary feature set is determined by selecting a plurality of either fixed length or variable length subsegments of a first segment; for each subsegment, computing a plurality of values by applying a set of functions to each subsegment; and from all the values computed for all the subsegments, selecting a first subset of values. In some embodiments, the first subset of values is used in determining resemblance between the first segment and a second segment.

In some embodiments, under resemblance compression (efficiently storing data segments using resemblance), a user write stream (corresponding to a whole file or an address range of a file or an address range of consecutive data for write) is broken into logical segments during processing in content store. The logical segments are sent to segment store for compression and storage. Content store also receives segment store feedback in the form of segment descriptors, each of which describes how a logical segment is compressed and represented in segment store. Content store maintains the mapping between the address range and its corresponding logical segments and segment descriptors returned from segment store. Content store is responsible for mapping an address range and its corresponding logical segments and segment descriptors and handing segment store segment descriptors for a user read stream (corresponding to a whole file or an address range of a file or an address range of consecutive data for read), and receiving data for logical segments. Content store under resemblance compression behaves largely similar to that under identity compression.

In some embodiments, segments are represented as a composite of multiple physical segments in segment store. To be more precise, each logical segment is represented as a base and a series of deltas of increasingly higher levels (or smaller sizes), where each base or delta is either a whole physical segment, or a part of a physical segment. A base corresponds directly to a logical segment in content store, and is denoted as d0. A one-level delta is the difference between two (different) logical segments, and is denoted as d1. A two-level delta is the difference between two (different) d1's, and is denoted as d2.

In various embodiments, resemblance compression uses one-level delta coding or two-level delta coding. In one-level delta coding, segment store represents each logical segment as a composite of a d0 that may be shared and an optional d1 that cannot be shared; in two-level delta coding, segment store represents each logical segment as a composite of a d0 that may be shared, an optional d1 that may be shared, and an optional d2 that cannot be shared. A logical segment is denoted an e0 if it's represented as a d0; a logical segment is denoted an e1 if its corresponding highest-level delta is a d1; a logical segment is denoted an e2 if its corresponding highest-level delta is a d2. Identity compression can be considered zero-level delta coding, where segment store represents each logical segment as a d0 that may be shared. There is no loss of information when the input data stream is stored in its compressed form (e.g., when a new segment from the input data stream is stored).

In some embodiments, d0 is large, a d2 is small, and a d1 is substantial in two-level delta coding—for example, a d0 is 1 MB, a d2 is 10 KB, and a d1 is 100 KB. Two-level delta coding balances the need for more aggressive compression (not only large d0 bases are shared among logical segments, substantial d1 differences are shared as well) and the need for higher performance and scalability (small d2 differences are not shared among logical segments, and are not subject to various processing and maintenance). To facilitate detecting sharable d1's in two-level delta coding, the additional constraint is imposed that a d1 is one-to-one with respect to an e1 (implying the segment identifier for a d1 is interexchangeable with the segment identifier for an e1). This allows comparing the resemblance between a new logical segment and previous e0's and e1's in the system using a summary technique called sketch at the logical segment level without worrying about physical segments. After the resemblance is detected, the new logical segment is coded as the composite of corresponding physical segments, either a sharable d0 or a sharable d0 plus a sharable d1, plus an optional non-sharable d2.

In some embodiments, multiple d1's and d2's may be combined into a single physical segment in segment store in a process called delta combining. Delta combining reduces the size of the location index that maps segment identifiers to their actual storage containers, and makes local compression more effective in segment store. It makes particular sense to combine d1's of the same logical stream in one-level delta coding, or d2's of the same logical stream in two-level delta coding, because they are not shared, and die together when the corresponding file is deleted from the system. If delta combining is performed in segment store, segment descriptors returned from segment store to content store should specify where each d1 or d2 starts and ends within the combined segment so that read and other operations can properly discern the particular d1 or d2 in the combined segment.

Figure 1:
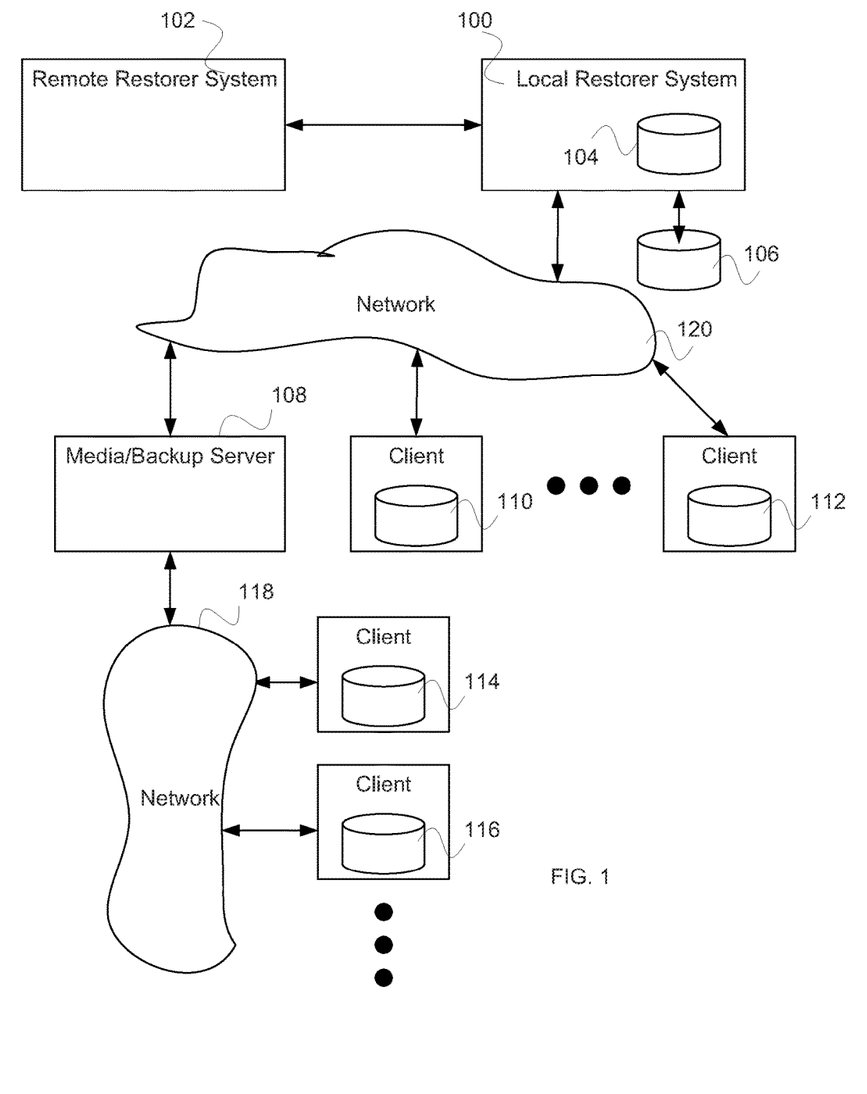
FIG. 1 is a block diagram illustrating an embodiment of a system for efficient storage using resemblance of data segments.

FIG. 1 is a block diagram illustrating an embodiment of a system for efficient storage using resemblance of data segments. In the example shown, local restorer system 100 stores information without loss of information in an input data stream that enables restoration of data originally stored on a client system in the event that the data on the client system is no longer available. Information is stored on an internal storage device 104 or an external storage device 106 of local restorer system 100. In various embodiments, internal storage device 104 comprises one storage device or a plurality of storage devices and/or external storage device 106 comprises one storage device or a plurality of storage devices. Local restorer 100 is in communication with remote restorer 102. Remote restorer 102 stores a copy of information that is stored on local restorer system 100 also enabling restoration of data originally stored on a client system. In various embodiments, local restorer 100 is in communication with remote restorer 102 using a dedicated communication link, one or more networks, a local area network, a wide area network, a storage area network, the Internet, a wired network, and/or wireless network.

Local restorer system 100 also communicates with a plurality of client systems with storage represented in FIG. 1 by client system with storage 110 and 112 using network 120. In various embodiments, network 120 comprises one or more networks, a local area network, a wide area network, a storage area network, the Internet, a wired network, and/or wireless network. Local restorer system 100 also communicates with media/backup server 108 using network 120. Media/backup server 108 communicates with a plurality of client systems with storage represented in FIG. 1 by client system with storage 114 and 116 using network 118. In various embodiments, network 118 comprises one or more networks, a local area network, a wide area network, a storage area network, the Internet, a wired network, and/or wireless network. In some embodiments, media/backup server 108 backs up data on client systems with storage which in turn is backed up to local restorer system 100.

Figure 2:
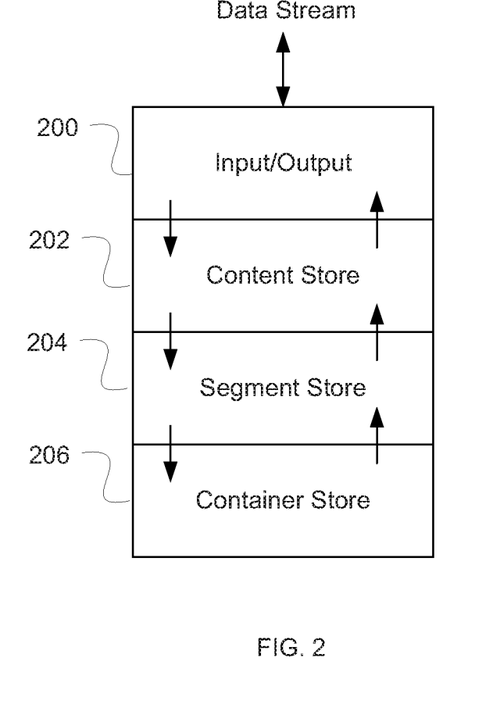
FIG. 2 is a block diagram illustrating an embodiment of processing for efficient storage using resemblance of data segments.

FIG. 2 is a block diagram illustrating an embodiment of processing for efficient storage using resemblance of data segments. In some embodiments, a restorer system such as local restorer system 100 of FIG. 1 processes data from client systems to efficiently store information and to restore data from the stored information. In the example shown, for writing data to storage, a linear data stream of bytes that originates from one or more client systems is input into input/output processing module 200. Data stream is passed to content store 202. Content store 202 generates logical segments, hands them to segment store 204 for compression and storage, waits for segment descriptors to be returned, and maintains the mapping from data address information to its corresponding logical segments and segment descriptors. Segment store 204 receives logical segments from content store 202, does resemblance compression to produce physical segments, locally compresses and packs physical segments into containers, and sends the results to container store 206 for storage, and returns segment descriptors to content store 202. Container store 206 stores the containers in a hard drive, a hard drive array, a network attached drive or array, and/or a RAID system. For reading data from storage, a request to read data is received at input/output 200. The request is sent to content store 202 in order to determine the relevant segment descriptors required to enable the requested data to be read. Content store 202 hands segment descriptors to segment store 204 for obtaining the segments and decompression, waits for segment data to return, and returns the relevant data to input/output 200. Segment store 204 receives segment descriptors from content store 202, requests physical segment reads from container store 206, locally decompresses physical segments, composes logical segments based on the physical segments, and returns segment data to content store 202. In various embodiments, physical segment reads are from a hard drive, a hard drive array, a network attached drive or array, and/or a RAID system.

Figure 3:
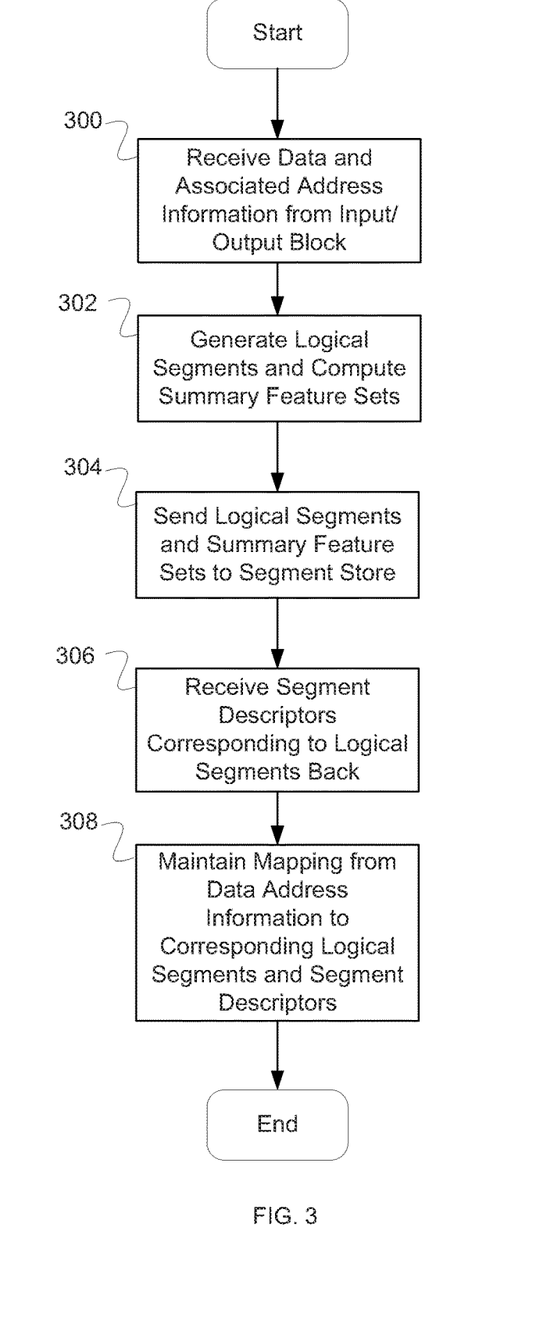
FIG. 3 is a flow diagram illustrating an embodiment of a content store process during writing.

FIG. 3 is a flow diagram illustrating an embodiment of a content store process during writing. In some embodiments, the content store writing process of FIG. 3 is implemented in content store 202 of FIG. 2. In the example shown, in 300 data and associated address information are received from input/output block. For example, a tuple consisting of a certain file, a certain offset, and a certain length is received from the input/output block. In 302, logical segments are generated and summary feature sets are computed. Logical segment generation, also referred to as anchoring, generates variable sized content-dependent but address-independent logical segments from an input data stream. In some embodiments, anchoring is achieved by hashing a moving window along the input data stream, and when the hash is equal to a particular value, defining a location with a fixed relation to the window in the input data stream as a segment boundary. The segment summary feature set computation comprises generating a number of features for each logical segment, such that sufficiently resembled logical segments are likely to have one or more matching features, and higher resemblance tends to generate more matching features. In some embodiments, segment summary feature set computation comprises $\{g_i[f_i(\text{subsegment}_j)] \ldots g_k[f_i(\text{subsegment}_j)]\}$ where $f_i$ is the $i^{th}$ function (e.g., a hash function or a linear function or a combination thereof) of the $j^{th}$ subsegment and where $g_k$ is the kth lowest/highest, or minimum/maximum, value of the computed segment summary feature set for k=1 ... n (e.g., the 6 lowest/highest values, for example $\{1^{st}, 2^{nd}, 3^{rd}, 4^{th}, 5^{th},$ and $6^{th}$ lowest/highest values$\}$); for example, calculate a $\max_i[f_i(\text{subsegment}_j)]$ for each i by calculating $f_i(\text{subsegment}_j)$ for each j and finding the maximum, and select from all the $\max_i$, the 6 highest values. In 304, logical segments and their computed summary feature sets are sent to segment store. In 306, segment descriptors corresponding to the logical segments are received back. In 308, the mapping from data address information to corresponding logical segments and segment descriptors is maintained. This mapping is used during a content store read process.

Figure 4:
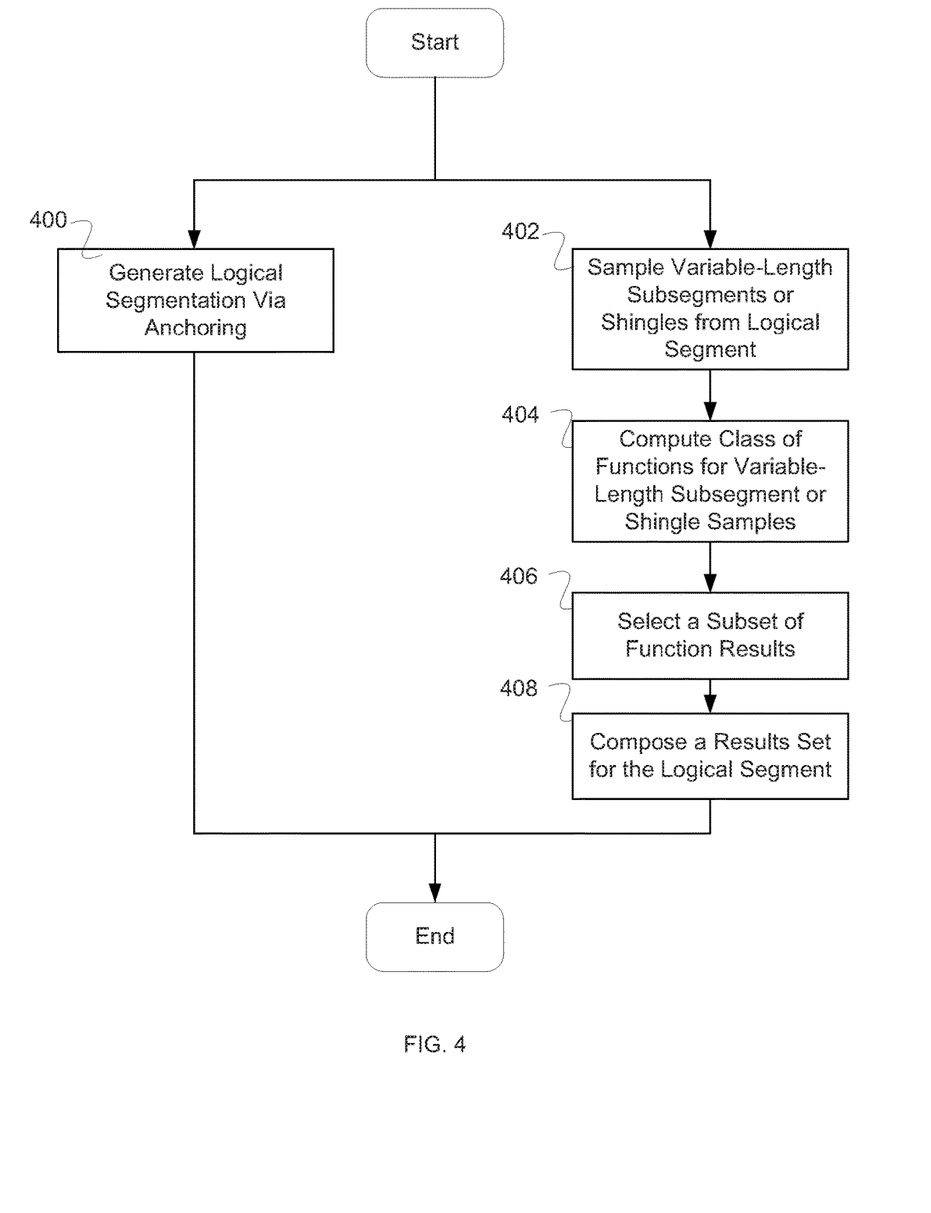
FIG. 4 is a flow diagram illustrating an embodiment of a process for generating logical segments and computing summary feature sets.

FIG. 4 is a flow diagram illustrating an embodiment of a process for generating logical segments and computing summary feature sets. In some embodiments, a summary feature set is used to characterize the segment and to be able to determine resemblance between segments. In some embodiments, the process of FIG. 4 is used to implement 302 of FIG. 3. In the example shown, in 400 logical segments are generated via anchoring. Anchoring is the process of locating a segment boundary based on a criterion. In some embodiments, the anchoring criterion comprises having a hash of a portion of the data stream equal a value.

In 402, variable-length subsegments or shingles are sampled from the segment. A shingle is a fixed length subsegment of the segment. Selecting a variable-length subsegment or a shingle is based on a criterion where the criterion is based at least in part on the values from the segment. In various embodiments, selecting a plurality of fixed length or variable length subsegments is based at least in part on the weighted sum of the bytes in a first running window of fixed size for some bytes in the segment.

In some embodiments, shingle sampling is determined by computing the (weighted) sum of the bytes in a running window of fixed size (potentially different from the shingle size) on a per-byte basis for all bytes in the segment. A shingle is sampled if the (weighted) sum of the bytes in the running window satisfies certain criterion—for example, the bottom 6 or 7 bits of the weighted sum are all 1's. The location with a fixed relation to the satisfying window position may be used as the starting position of the shingle sample.

In some embodiments, variable-length subsegment sampling is determined by computing the (weighted) sum of the bytes in a running window of fixed size on a per-byte basis for all bytes in the segment. A variable-length subsegment is sampled if the (weighted) sum of the bytes in the running window satisfies certain criterion—for example, the bottom 6 or 7 bits of the weighted sum are all 1's. The location with a fixed relation to the satisfying window position may be used as the starting position of the variable-length subsegment sample. In some embodiments, the end position of the variable-length subsegment sample may be determined using the same running window mechanism as the determination for the staring position, under various combinations of window size, weighting formula, satisfaction criterion, and fixed offset from satisfying window position. In some embodiments, the starting position and the end position of a variable-length subsegment sample are determined using the same running window and (weighted) sum.

In 404, a class of functions is computed for the variable-length subsegment or shingle samples. In some embodiments, the class, or set, of functions comprise a set of linear functions. In some embodiments, the set of functions comprise $m_k x_k + a_k$ wherein $m_k$ and $a_k$ are different predetermined values for k=1 to n and wherein $x_k$ comprises a function of the variable-length subsegment or shingle samples. In some embodiments, the set or class of a functions comprise $m_k x + a_k$ where the class of functions is specified by having different values for $m_k$ and $a_k$ for k=1 to n and where x is a function of the variable-length subsegment or shingle samples (e.g., a hash of a subsegment or shingle sample, a sum of the bytes in a subsegment or shingle sample, etc.). In various embodiments, the class of functions is any series of functions that provides a degree of orthogonality. In various embodiments, the function of the variable-length subsegment or shingle samples comprises SHA-1 (Secure Hash Algorithm 1), MD5 (Message-Digest algorithm 5), RIPEMD-160 (RACE Integrity Primitives Evaluation Message Digest 160-bit version), a Rabin hash, or any other appropriate hash function. In 406, a subset of function results is selected. In some embodiments, the subset—a first subset—of function results, or values, is used in determining resemblance between a first segment and a second segment. In some embodiments, a plurality of extrema values of the function results are selected—for example, six of the lowest values (minima) are selected. In various embodiments, the extrema values comprise minima values or maxima values or minima and maxima values. In some embodiments, the subset of function results is passed to 408 for processing. In some embodiments, the underlying variable-length subsegment or shingle samples corresponding to the subset of function results are further processed by hashing to another subset of function results. In some embodiments, this other subset—a second subset—of function results, or values, is used in determining resemblance between a first segment and a second segment. In 408, a set of the results is composed for the segment. The set is a summary feature set, and each value of the set is a feature. A sketch is a summary feature set with a fixed number of features, and whose corresponding feature values should be matched on a per feature basis for the resemblance comparison between any pair of logical segments. In some embodiments, the minima values of the function results are composed in a predetermined order (e.g., minima value of the first function to minima value of the last function of the set of function) to produce features in a sketch. In some embodiments, multiple features, each of which is composed of six minima, form a segment sketch. In some embodiments, this set of results—a third subset—is composed based at least in part on the first subset of function results. In some embodiments, this composed subset—the third subset—of function results, or values, is used in determining resemblance between a first segment and a second segment. In some embodiments, the order of composing the third subset of values is pre-determined and independent of the value in the first subset. In some embodiments, a fourth subset of results is composed based at least in part on the second subset of results (produced by hashing as mentioned above). In some embodiments, this composed subset—the fourth subset—of function results, or values, is used in determining resemblance between a first segment and a second segment. In some embodiments, the order of composing the fourth subset of values is pre-determined and independent of the value in the second subset.

In some embodiments, a summary feature set is determined by (a) selecting m subsegments of a first segment; (b) selecting n functions; and (c) for function i, wherein i is a value from 1 to n, (i) computing m values $f_i(subsegment_j)$ wherein j is a value from 1 to m; and (ii) selecting an $i^{th}$ extrema value comprising a minimum or maximum value from the m values; and (d) selecting a first subset of values from the n extrema values.

Figure 5:
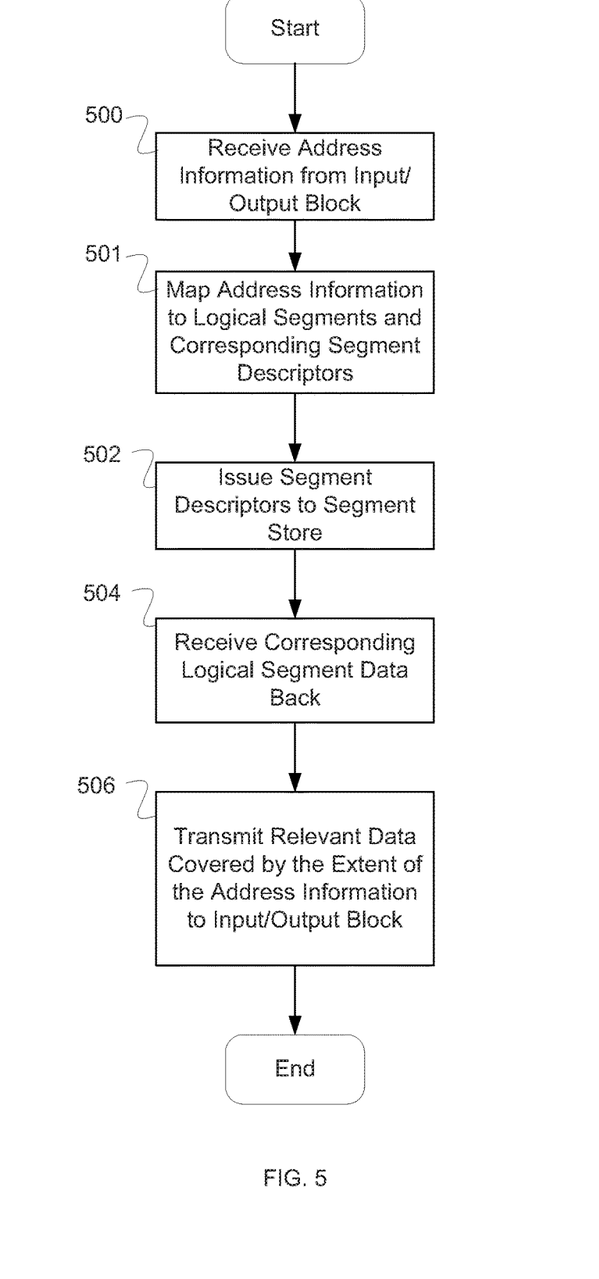
FIG. 5 is a flow diagram illustrating an embodiment of a content store process during reading.

FIG. 5 is a flow diagram illustrating an embodiment of a content store process during reading. In some embodiments, the content store reading process of FIG. 5 is implemented in content store 202 of FIG. 2. In the example shown, in 500 address information is received from the input/output block. The address information corresponds to a request to read data from a file at a certain offset for a certain length. In 501, the address information is mapped to relevant logical segments and corresponding segment descriptors. In 502, segment descriptors are issued to segment store. In 504, corresponding logical segment data are received back. In 506, the relevant data covered by the extent of the address information is transmitted to the input/output block.

Figure 6:
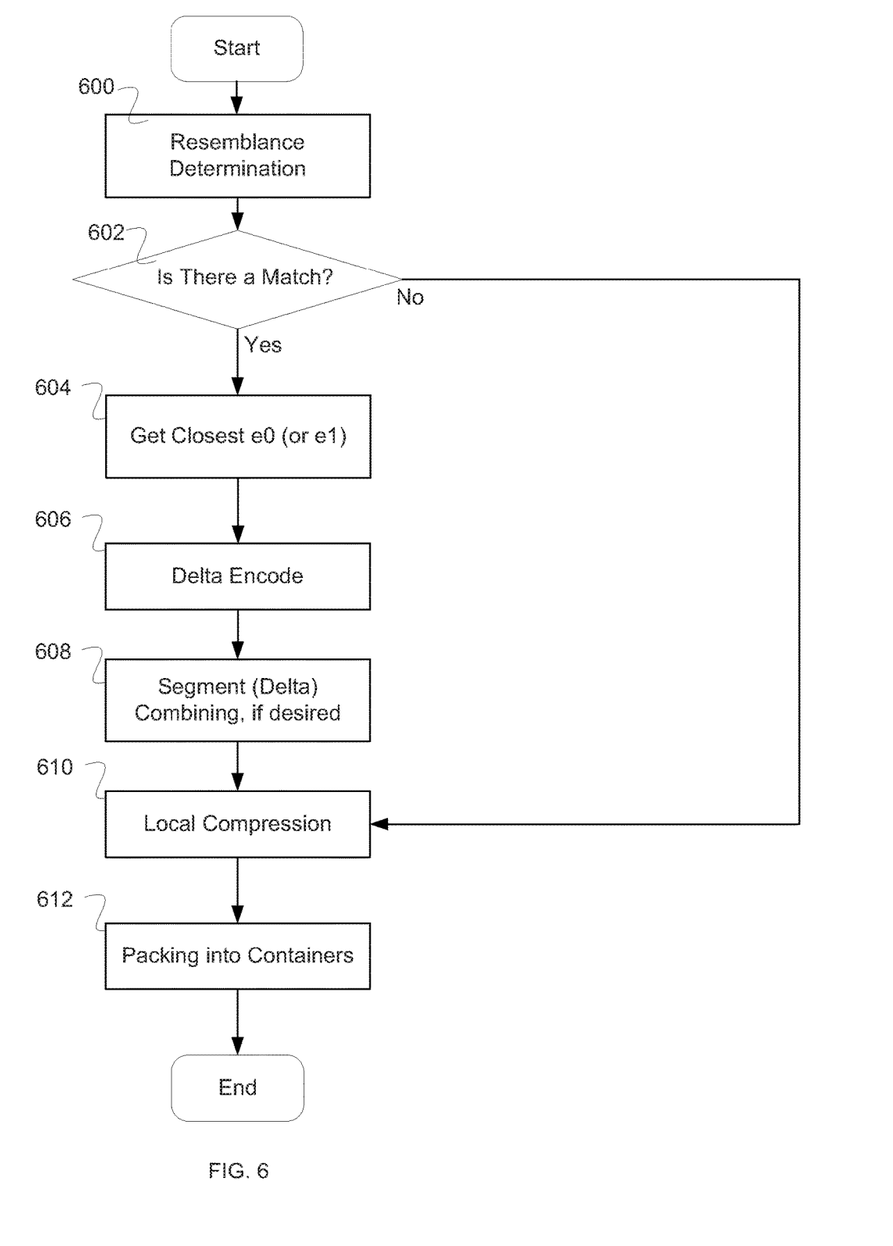
FIG. 6 is a flow diagram illustrating an embodiment of a segment store process during writing.

FIG. 6 is a flow diagram illustrating an embodiment of a segment store process during writing. In some embodiments, the segment store writing process of FIG. 6 is implemented in segment store 204 of FIG. 2. In the example shown, in 600 resemblance is determined. The closest e0 or e1 previously stored to the current segment is found using a match of the segment summary feature set, or of the segment sketch. In 602, it is determined if there is a match. If there is not a match, then control passes to 610.

If there is a match, then in 604 the closest e0 and e1 are retrieved from storage. The retrieval includes reconstruction of the most resembling e0 for one-level delta coding and the most resembling e0 or e1 for two-level delta coding. An e0 is stored as a d0 in segment store, whereas an e1 is stored as a d0 plus a d1. Therefore, the retrieval involves reading one physical segment in one-level delta coding, and reading either one or two physical segments in two-level delta coding. All physical segments are stored in locally compressed form in segment store. If only one physical segment is read, it will be locally decompressed to form the e0; if two physical segments are read, they will be locally decompressed, and composed in delta decoding to form the e1. Delta decoding is only applied if the most resembling e0/e1 is an e1 under two-level delta coding. The decoding is the process of composing an e1 from the underlying d0 and d1.

In 606, the new segment is delta encoded from the closest e0 and e1. Delta encoding is the process of generating the difference between the incoming logical segment and an existing e0 or e1. If the new segment is a new e1, delta encoding is the process of generating the d1 between new segment and the most resembling e0 segment (generated from 604). If new segment is an e2, delta encoding is the process of generating the d2 between the new segment and the most resembling e0/e1 (generated from 604).

In some embodiments, there is a check to make sure that the difference between the new segment and the closest e0 and e1 is small. Because segment summary feature set or segment sketch matching only presents the probabilistic evidence of resemblance (or un-resemblance for that matter), the size ratio test after delta encoding between the new segment and its most resembling logical segment (either an e0 or an e1) can be performed to ascertain the roles of the new segment and its most resembling segment are classified correctly. If the ratio of the delta size over a function of either the new segment size or the closest e0/e1 size or both exceeds a pre-specified threshold (e.g., one third), new segment should be made a new e0 regardless of its previous classification. Under two-level delta coding, if the ratio of the delta size over a function of either the new segment size or the closest e0/e1 size or both is less than a pre-specified threshold (e.g., one twentieth), new segment should be made a new e2 if its previous classification is a new e1.

In 608, segments and deltas are combined, if desired. Multiple d1's or d2's produced from different logical segments of the same logical stream can be combined into a single physical segment. Delta combining can be considered as a size normalization procedure so that the average physical segment size is of at least a certain size (e.g., 100 K or more). This should give good local compression result, despite delta encoding. More importantly, it generates fewer entries in the location index. It makes particular sense to combine d1's of the same logical stream in one-level delta coding, or d2's of the same logical stream in two-level delta coding, because they are not shared, and die together when the corresponding file is removed. In some embodiments, d1's of the same logical stream in two-level delta coding are combined. If delta combining is applied, proper bookkeeping should be done so that individual difference in a combined physical segment can be recovered later on in a delta separation process for reading; in particular, relevant segment descriptors returned from segment store to content store should include information as to how to recover respective differences from the combined segment during delta separation. Regardless of whether delta combining is applied, each logical segment sent to segment store from content store, should result in a segment descriptor sent back from segment store to content store. Correspondence information should be maintained in delta combining so that the number and the order of segment descriptors returned from segment store to content store are proper.

In some embodiments, segment identifier is computed. The segment identifier computation is the process of assigning a unique identifier to each new physical segment. This identifier is returned to content store as a part of a segment descriptor so that the physical segment can be read in the future. In various embodiments, the segment identifier comprises a fingerprint of the physical segment or a serially generated number.

In some embodiments, a delta identifier is computed. The delta identifier computation is the process of assigning a unique identifier to each new delta. This identifier is returned to content store as a part of a segment descriptor so that the delta can be read in the future. In various embodiments, the delta identifier comprises a fingerprint of the delta or a serially generated number. In various embodiments, delta comprises a one-level delta, a two-level delta, or any other appropriate delta.

In some embodiments, the segment descriptor is transmitted to content store. This is the process of returning the segment descriptor from segment store to content store for each logical segment sent from content store to segment store. A segment descriptor allows the reading of a logical segment from segment store by content store. Each segment descriptor should include all segment identifiers for physical segments involved in the composition of the logical segment; if any physical segment is combined from multiple differences, offset and size information to find the relevant difference within the physical segment should be present in the segment descriptor as well. In some embodiments, it is desirable to have the segment descriptor feedback occur after the corresponding physical segment has been written to a more permanent memory (e.g., NVRAM) so that the logical segment will survive software crashes or hardware crashes when content store receives the segment descriptor feedback from segment store In 610, the segment and delta are locally compressed. Local compression is the process of compressing a new physical segment from the uncompressed form into the locally compressed form using only information within the physical segments itself. In various embodiments, a local compression algorithm comprises Ziv-Lempel compression, Lempel-Ziv (LZ) compression, Lempel-Ziv-Welch (LZW) compression, or any other appropriate compression.

In 612, the locally compressed data is packed in containers. Container packing generates containers from new physical segments, which includes segments and deltas, in the locally compressed form. When enough new physical segments from the same logical stream have accumulated to approximate the size of a container, they are packed into a container and written to a container store for storage to disk. New physical segments are properly shadowed and stored in a permanent memory (e.g., NVRAM) to protect against data losses due to software crashes or hardware failures, until these physical segments have been written to disk via containers. After a container is written to disk, container store notifies segment store. Segment store can safely remove all relevant physical segments from permanent memory (e.g., NVRAM). In addition, relevant segment identifier to disk container mappings are added to both the resemblance index and the location index so that future logical segments can benefit from the resemblance to previous e0's and e1's.

Figure 7:
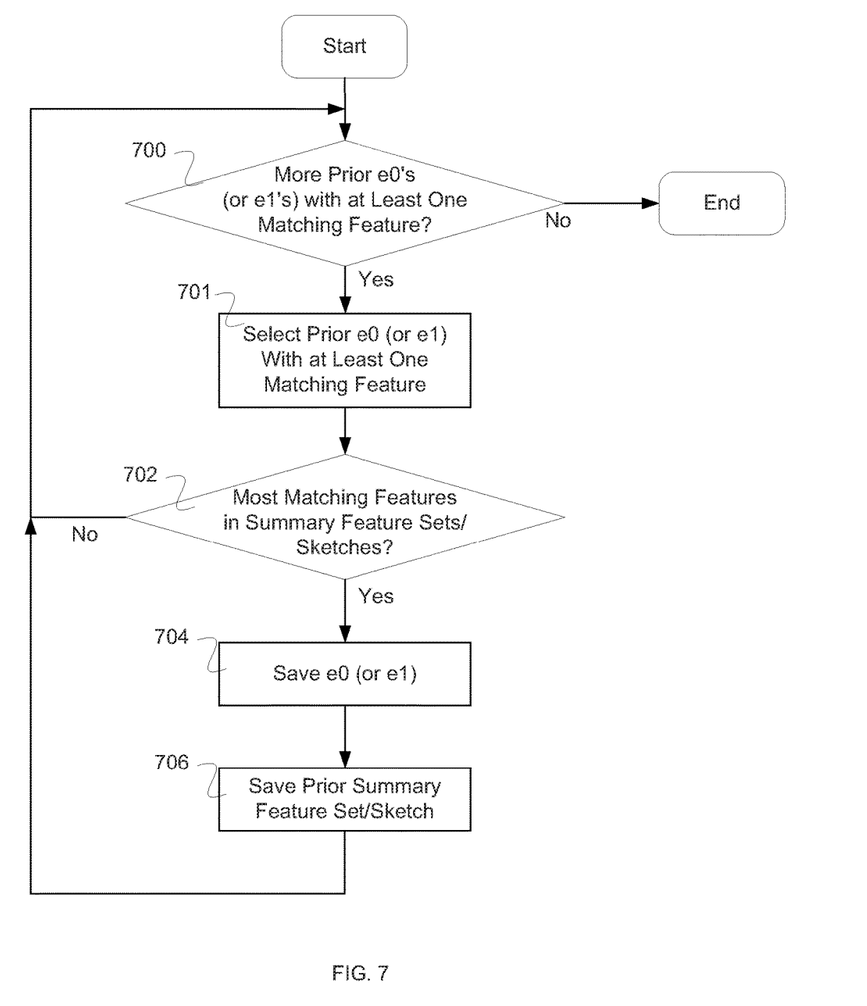
FIG. 7 is a flow diagram illustrating an embodiment of a process for resemblance determination.

FIG. 7 is a flow diagram illustrating an embodiment of a process for resemblance determination. In some embodiments, the process of FIG. 7 implements 600 of FIG. 6. On a high level, segment resemblance determination finds the most resembling prior logical segment to a new logical segment. More precisely, it determines for a new logical segment if there are prior e0's with one or more matching features and which one has the most matching features or under two-level delta coding, if there are prior e1's with one or more matching features, and which one has the most matching features. If the answers to both questions are negative, the new logical segment is a new e0. Otherwise, the e0 or e1 (under two-level delta coding) with the most matching features will be used to delta encode the new logical segment. Depending on how large the delta is, the new logical segment is a redundant e0 or an e1 under one-level delta coding, a redundant e0, a redundant e1, an e2 or a new e1 under two-level delta coding. A new e0 or e1 (under two-level delta coding only) can be used to delta encode future logical segments. In some embodiments, an in-memory resemblance index is maintained to perform segment resemblance determination. All new e0's (and e1's under two-level delta coding) are entered into this index. This index is composed of multiple feature sub-indices, each of which corresponds to one feature and indicates, for that feature, if a particular value is present, and what e0's and e1's possess this value.

In the example shown in FIG. 7, the previously stored prior e0 (or e1) is potentially the most closely matched segment to the input logical segment, and is initialized to Nil at Start. In 700, it is determined if there are more prior e0's (or e1's) with at least one matching feature to the input segment while trying to locate a closest match. If there are no more such prior e0's (or e1's), then the process ends. If there are more such prior e0's (or e1's), then in 701 the next prior e0 (or e1) with at least one matching feature is selected, and control passes to 702. In 702, it is determined if the prior e0 (or e1) has the most matching features in the summary feature set or sketch to the input segment. The most matching features in the summary feature set or sketch to the input segment by the prior e0 (or e1) would indicate a likely closest match to the input segment by the prior e0 (or e1) itself. If it does not have the most matching features, then control is passed to 700. If it does have the most matching features, then in 704 the prior e0 (or e1) is saved as potentially the closest match and in 706 the corresponding summary feature set or sketch is also saved and control passes to 700.

In some embodiments, for each new segment, ns, resemblance determination is done through the following feature test:

For each feature k, determine the set of e0's and e1's in resemblance index matching ns with the same feature value. S[k], where each element in S[k] is of the form <s, 1>, and s is the segment identifier; If no base does, S[k] is NULL.

Merge S[k] for all features {k} into a single set S where each element is of the form <s, c>, s is the segment identifier, and c is the count of feature values that s matches ns. If no base does, S is NULL.

If S is NULL, no e0's or e1's resemble ns, and ns should be made a new e0.

Otherwise, find <s, c> in S whose c is the largest. To break ties with the same c, <s, c> with the most recent s is used.

For one-level delta coding, return s as being most resembling, and ns is coded as s plus a d1. Note s is always an e0 under one-level delta coding and the d1 will be empty if ns is a duplicate of s.

Otherwise, (for two-level delta coding) if c from the last step exceeds a pre-determined threshold e2_feature (to ensure ns can be delta encoded as s plus a d2), return s as being most resembling, and ns is coded as s plus a d2. Note s can be either an e0 or an e1, and the d2 is empty if ns is a duplicate of s.

Otherwise, find <s, c> in S whose s is an e0, and whose c is the largest. To break ties with the same c, <s, c> with the most recent e0 is used.

If no such <s, c> exists, or c is less than a pre-determined threshold e0_feature (default to 1), no e0's or e1's resemble ns enough, and ns should be made a new e0.

Otherwise, return s as being most resembling, and ns should be made a new e1.

Figure 8:
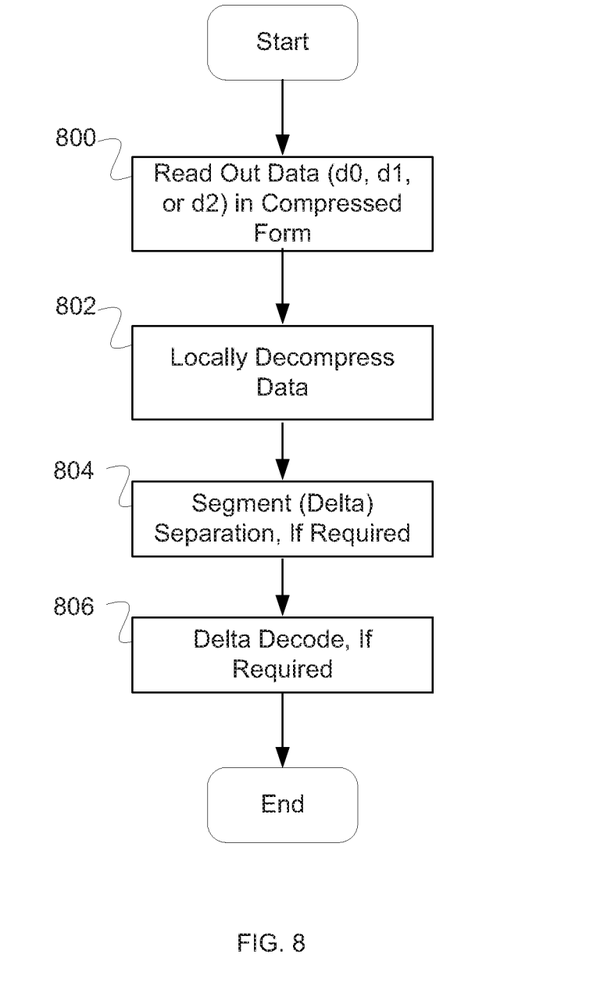
FIG. 8 is a flow diagram illustrating an embodiment of a segment store process for reading.

FIG. 8 is a flow diagram illustrating an embodiment of a segment store process for reading. In some embodiments, the process of FIG. 8 is implemented in segment store 204 of FIG. 2. In some embodiments, the process of FIG. 8 is implemented in 604 of FIG. 6. In the example shown, in 800 data corresponding to segment descriptors (a d0, an optional d1 under one-level delta coding, or a d0, an optional d1, an optional d2 under two-level delta coding) are read out in locally compressed form. In 802, the locally compressed data is locally decompressed. The process of local decompression is to transform the locally compressed physical segment form read in 800 into uncompressed form. Local decompression is the reverse of local compression in 610 of FIG. 6. In 804, delta separation is performed, if required. This step is only applied if the corresponding difference is included in a combined physical segment. Delta combining combines multiple differences into a single physical segment during write. In particular, we can combine d1's of the same logical stream in one-level delta coding, and d2's of the same logical stream in two-level delta coding. Delta separation is the inverted process of getting an individual difference, be it a d1 or a d2, from the already locally decompressed combined segment during read. In 806, the data is delta decoded, if required. This step is only applied if either a d1 or a d2 is involved. It is the process of composing an e1 from the underlying d0 and d1, or an e2 from the underlying d0 and d2, or an e2 from the underlying d0, d1, and d2. All individual differences in a combined segment are likely read next to each other for reading. It makes sense to have an uncompressed combined segment cache so that all processing costs (in 800 and 802) associated with the combined segment are amortized to all differences in the combined segment, as opposed to just one difference in the combined segment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for resemblance compression comprising:
a processor; and
a memory to store instructions, which when executed by the processor, cause the processor to perform operations of resemblance compression, the operations including
determining whether a logical segment that matches a current segment is stored;
retrieving a closest logical segment to the current segment from a segment store;
encoding the current segment based at least in part on the closest logical segment;
compressing the current segment; and
packing the current segment into a container to store in a container store.

2. The system of claim 1, wherein the operations further comprise:
dividing a data stream into a plurality of segments; and
selecting the current segment from the plurality of segments, wherein the determining, retrieving, encoding, compressing and packing are performed iteratively for each of the plurality of segments.

3. The system of claim 1, wherein determine whether a logical segment that matches a current segment is stored comprises:
computing a set of one or more functions to the current segment to generate a summary feature of the current segment; and
comparing the summary feature against summary features of a plurality of logical segments stored.

4. The system of claim 3, wherein the closest logical segment is identified based on the comparison of the summary feature of the current segment and the closest logical segment.

5. The system of claim 3, wherein the one or more functions comprise one or more non-linear functions.

6. The system of claim 3, wherein the one or more functions comprise one or more of the following: SHA-1, MD5, RIPEMD-160, a Rabin hash, and a hash function.

7. The system of claim 1, wherein encoding the current segment based at least in part on the closest logical segment comprises encoding the current segment based on a reference to the closest logical segment and a delta representing a difference between the current segment and the closest logical segment.

8. A computer-implemented method for resemblance compression, the method comprising:
determining, by a segment store of a restorer executed by a processor, whether a logical segment that matches a current segment is stored;
retrieving by the segment store a closest logical segment to the current segment from a segment store;
encoding by the segment store the current segment based at least in part on the closest logical segment;
compressing by the segment store the current segment; and
packing by the segment store the current segment into a container to store in a container store.

9. The method of claim 8, further comprising:
dividing a data stream into a plurality of segments; and
selecting the current segment from the plurality of segments, wherein the determining, retrieving, encoding, compressing and packing are performed iteratively for each of the plurality of segments.

10. The method of claim 8, wherein determine whether a logical segment that matches a current segment is stored comprises:
computing a set of one or more functions to the current segment to generate a summary feature of the current segment; and
comparing the summary feature against summary features of a plurality of logical segments stored.

11. The method of claim 10, wherein the closest logical segment is identified based on the comparison of the summary feature of the current segment and the closest logical segment.

12. The method of claim 10, wherein the one or more functions comprise one or more non-linear functions.

13. The method of claim 10, wherein the one or more functions comprise one or more of the following: SHA-1, MD5, RIPEMD-160, a Rabin hash, and a hash function.

14. The method of claim 8, wherein encoding the current segment based at least in part on the closest logical segment comprises encoding the current segment based on a reference to the closest logical segment and a delta representing a difference between the current segment and the closest logical segment.

15. A non-transitory machine-readable medium having instructions stored therein, which when executed by a processor, cause the processor to perform operations of resemblance compression, the operations comprising:
  determining whether a logical segment that matches a current segment is stored;
  retrieving a closest logical segment to the current segment from a segment store;
  encoding the current segment based at least in part on the closest logical segment;
  compressing the current segment; and
  packing the current segment into a container to store in a container store.

16. The machine-readable medium of claim 15, wherein the operations further comprise:
  dividing a data stream into a plurality of segments; and
  selecting the current segment from the plurality of segments, wherein the determining, retrieving, encoding, compressing and packing are performed iteratively for each of the plurality of segments.

17. The machine-readable medium of claim 15, wherein determine whether a logical segment that matches a current segment is stored comprises:
  computing a set of one or more functions to the current segment to generate a summary feature of the current segment; and
  comparing the summary feature against summary features of a plurality of logical segments stored.

18. The machine-readable medium of claim 17, wherein the closest logical segment is identified based on the comparison of the summary feature of the current segment and the closest logical segment.

19. The machine-readable medium of claim 17, wherein the one or more functions comprise one or more non-linear functions.

20. The machine-readable medium of claim 17, wherein the one or more functions comprise one or more of the following: SHA-1, MD5, RIPEMD-160, a Rabin hash, and a hash function.

21. The machine-readable medium of claim 15, wherein encoding the current segment based at least in part on the closest logical segment comprises encoding the current segment based on a reference to the closest logical segment and a delta representing a difference between the current segment and the closest logical segment.

* * * * *